United States Patent [19]

Mizutani et al.

[11] Patent Number: 4,781,833

[45] Date of Patent: Nov. 1, 1988

[54] HOLLOW FIBER FLUID SEPARATOR

[75] Inventors: Shoji Mizutani; Nobuo Taneda, both of Iwakuni, Japan

[73] Assignee: Teijin Limited, Osaka, Japan

[21] Appl. No.: 796,865

[22] Filed: Nov. 12, 1985

[30] Foreign Application Priority Data

| Nov. 16, 1984 | [JP] | Japan | 59-240589 |
| Nov. 16, 1984 | [JP] | Japan | 59-240590 |
| Nov. 16, 1984 | [JP] | Japan | 59-240591 |
| May 30, 1985 | [JP] | Japan | 60-115270 |
| Jun. 19, 1985 | [JP] | Japan | 60-131990 |

[51] Int. Cl.$^4$ .............................................. B01D 13/01
[52] U.S. Cl. ...................... 210/321.81; 210/321.9
[58] Field of Search ............ 210/321.1, 500.23, 321.2, 210/321.3, 321.4, 321.5, 321.78, 321.79, 321.8, 321.81, 321.87, 321.88, 321.89, 321.9

[56] References Cited

U.S. PATENT DOCUMENTS 4,124,509 11/1978 Iijima et al. .................... 210/321.3
4,332,752 6/1982 Henne et al. ........................ 264/41

FOREIGN PATENT DOCUMENTS 48-0075481 10/1973 Japan .
56-0148908 11/1981 Japan .
57-0071407 5/1982 Japan .
58-0142043 9/1983 Japan .
58-0169510 10/1983 Japan .

*Primary Examiner*—Ivars Cintins
*Attorney, Agent, or Firm*—Kenyon & Kenyon

[57] ABSTRACT

Disclosed is a fluid separator comprising a shell filled with a bundle of hollow fibers having a selective permeability, wherein a majority of the hollow fibers each has on the periphery thereof 1 to 10 fins extending in the longitudinal direction, and the occupancy ratio y of the sections, defined by the peripheries, of all the hollow fibers exclusive of the fin portions in the hollow fiber bundle to the section, vertical to the axial direction of the hollow fiber bundle, of the inner wall of the shell is within a range defined by the following formula (I):

$$41 - 3.1\sqrt{\alpha x} \leq y \leq 61 - 3.1\sqrt{\alpha x} \qquad (I)$$

wherein x stands for the average fin number per hollow fiber in the hollow fiber bundle, and $\alpha$ indicates the ratio $H/d$ of the average fin height $H(\mu)$ in the hollow fiber bundle to the average outer diameter d ($\mu$) of the hollow fibers exclusive of the fin portions.

14 Claims, 1 Drawing Sheet

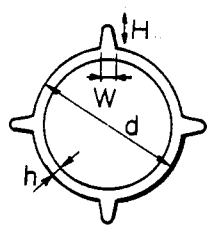
Fig. 1
Fig. 2  Fig. 3  Fig. 4
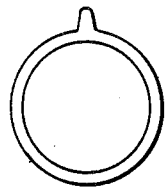 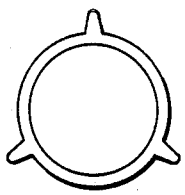 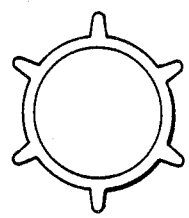
Fig. 5
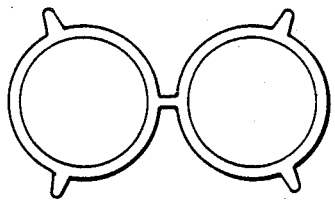
Fig. 6  Fig. 7  Fig. 8
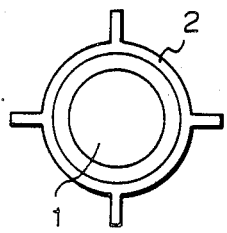 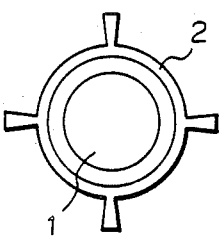 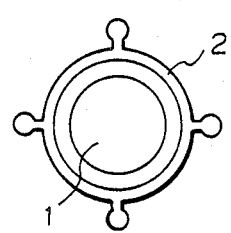

HOLLOW FIBER FLUID SEPARATOR

BACKGROUND OF THE INVENTION

1. Field of the Invention

The present invention relates to a fluid separator, a hollow fiber to be used for construction thereof and a process for the preparation of this hollow fiber. More particularly, the present invention relates to a hollow fiber type fluid separator comprising hollow fibers having fins on the periphery thereof, such a hollow fiber, and a process for the preparation thereof.

As the fluid separation intended in the present invention, there can be mentioned liquid separation such as dialysis, ultrafiltration, precision filtration, pervaporation, or reverse osmosis and gas separation such as oxygen enriching in air.

2. Description of the Related Art

Fluid separators comprising hollow fibers having a selective permeability have been practically used for the reverse osmosis or hemodialysis.

Especially, hollow fiber type blood dialyzers have been vigorously used for purifying blood of patients suffering from the renal insufficiency. In a blood dialyzer of this type, many permeable membranes, for example, hollow fiber membranes, are filled in a shell, and blood of a patient is passed through the hollow interiors and a dialyzing solution (or dialysate) is passed outside the membranes, that is, spaces among the membranes. Wastes in the blood are removed through the hollow fibers by dialysis to correct the electrolyte concentration, and by producing a difference of the pressure between the inside and outside of the hollow fibers, excessive water is removed from the blood by ultrafiltration. Furthermore, hollow fibers are used for remedy of an autoimmune disease by separating only plasma from blood or removing a specific component from the separated plasma. Hollow fibers to be used for such blood treatments should allow selective permeation of specific solutes according to the intended use. The capacity of a hollow fiber depends on the material, the porosity (pore size and pore number) and the membrane thickness of the hollow fiber. For example, it is important how a number of hollow fibers should be bundled so as to increase the dialyzing efficiency of the entire membrane surface. For example, when hollow fibers are arranged in the longitudinal direction closely to one another, the dialyzing solution does not flow uniformly around the hollow fibers but forms specific flow paths, with the result that dialysis is hardly performed through hollow fibers not participating in these flow paths and the entire dialyzing effect is reduced. In the ordinary dialytic operation, the difference of the concentration between the inside and outside of the hollow fiber membrane is a driving force for the transport of the solute. Accordingly, it is necessary to make a contrivance on the shape of the hollow fiber per se so that the dialyzing solution flows through the outside space of the hollow fiber as uniformly as possible, the area having a larger boundary layer resistance is reduced as much as possible and the difference of the concentration between the blood side (the inner side of the hollow fiber) and the dialyzing solution side (the outer side of the hollow fiber) is increased.

As means for solving this problem, there has been proposed a method in which by increasing the amount contained (filling ratio) of hollow fibers in a dialyzer shell to some extent, a certain flow resistance is given to a dialyzing solution to uniformalize the flow thereof. Furthermore, there has been proposed a method in which hollow fibers are crimped or cover yarns are wound around the hollow fibers to prevent contact of the hollow fibers with one another and increase the efficiency of the transport of the solute by the flowing of the dialyzing solution. However, these methods are still insufficient and further improvements are desired.

SUMMARY OF THE INVENTION

It is therefore a primary object of the present invention to solve the above problem and provides a fluid separator valuable especially as a blood treating device having a high blood treatment efficiency.

Another object of the present invention is to provide a small-size fluid separator having a high performance, in which finned hollow fibers that can be stably and easily prepared are contained in an optimum filling state.

Still another object of the present invention is to provide a finned hollow fiber for use in this fluid separator and a process for the preparation of this finned hollow fiber.

We made research with a view to attaining these objects and as the result, it was found that in a fluid separator in which a bundle of finned hollow fibers extending in the longitudinal direction is set, if the shape of the hollow fibers and the filling state of the hollow fiber bundle are appropriately arranged, the separation efficiency is greatly increased. We have now completed the present invention based on this finding.

More specifically, in accordance with one fundamental aspect of the present invention, there is provided a fluid separator comprising a shell filled with a bundle of hollow fibers having a selective permeability, wherein a majority of the hollow fibers each has on the periphery thereof 1 to 10 fins extending in the longitudinal direction, and the occupancy ratio y of the sections, defined by the peripheries, of all the hollow fibers exclusive of the fin portions in the hollow fiber bundle to the section, vertical to the axial direction of the hollow fiber bundle, of the inner wall of the shell is within a range defined by the following formula (I):

$$41 - 3.1\sqrt{\alpha x} \leq y \leq 61 - 3.1\sqrt{\alpha x} \tag{I}$$

wherein
x stands for the average fin number per hollow fiber in the hollow fiber bundle, and $\alpha$ indicates the ratio H/d of the average fin height H ($\mu$) in the hollow fiber bundle to the average outer diameter d ($\mu$) of the hollow fibers exclusive of the fin portions.

BRIEF DESCRIPTION OF THE DRAWINGS

FIGS. 1, 2, 3, 4, and 5 are enlarged sectional views illustrating hollow fibers valuably used in the present invention.

FIGS. 6, 7, and 8 are diagrams illustrating examples of the shape of the nozzle for spinning hollow fibers valuably used in the present invention.

DESCRIPTION OF THE PREFERRED EMBODIMENTS

The present invention will now be described in detail. The most characteristic feature of the present invention resides in the finding that when finned hollow fibers are used, the number of the hollow fibers to be filled can be greatly reduced and if the configurations of the finned hollow fibers, that is, the number and height of fins, and the amount of the hollow fibers to be filled in the shell satisfy specific requirements, the dialysis performance per unit effective area of the hollow fibers is increased and the insertion of the hollow fibers into the shell is greatly facilitated.

The term "sections defined by the peripheries" as used herein refers to the sections of the radial thickness plus hollow core of the hollow fiber other than fin portions.

In the present invention, the number x of the fins in the hollow fiber is at least 1. However, if the number x of the fins is 11 or larger, reduction of the effective membrane area by the root portions of the fins becomes conspicuous, resulting in drastic reduction of the solute dialyzing performance and the water permeation performance. The number x is ordinarily 1 to 10, but it is preferred that the number x be 2 to 7, especially 3 to 6.

In the present invention, $\alpha$ is a parameter indicating the fin height. When a plurality of fins differing in the height are formed, the arithmetic mean value is used. In view of the separation efficiency, it is preferred that the value $\alpha$ be 0.01 to 0.8, especially 0.03 to 0.2.

The sections of typical examples of the finned hollow fiber valuably used in the present invention are shown in FIGS. 1 through 5.

Other dimensions of the hollow fiber are not particularly critical in the present invention. However, it is preferred that the outer diameter d be 100 to 400$\mu$, especially 200 to 300$\mu$, the membrane thickness h of the fin-free portion be 5 to 50$\mu$, especially 5 to 30$\mu$, particularly especially 10 to 25$\mu$, and the fin height H be 5 to 100$\mu$, particularly especially 9 to 60$\mu$. Moreover, it is preferred that the width W of the root portion of the fin be narrower than the width of the upper portion. Ordinarily, after the spinning solution is extruded from a spinneret, the root portion tends to be expanded by the surface tension. It is preferred that the width W be 15 to 50$\mu$, especially 20 to 40$\mu$. If the width is within this range, the circularity of the hollow fiber exclusive of the fin portion is good, and when the hollow fiber is used for a blood dialyzer, coagulation of blood in the hollow fiber is hardly caused or blood is hardly left in the hollow fiber.

The sectional shape of the hollow fiber exclusive of the fin portion is not limited to a circular shape, but the section may be ellipsoidal. In the ellipsoidal section, the outer diameter d is a mean value of the long diameter and the short diameter. Furthermore, the fins on the periphery of the hollow fiber may have a spiral shape.

In the case where a plurality of fins are formed on one hollow fiber, the respective fins may be the same or different in the height H or the width W. At least two hollow fibers may be connected through fins. In this case, however, the number of the connected hollow fibers is preferably 2.

In the fluid separator of the present invention, the shell preferably has a circular shape, and in this case, the above-mentioned occupancy ratio y is expressed by the following formula (II):

$$Y = (Nd^2/D^2) \times 100 \ (\%) \quad (II)$$

wherein
D stands for the inner diameter ($\mu$) of the shell in which the hollow fiber bundle is filled, d stands for the average outer diameter ($\mu$) of the hollow fibers exclusive of the fin portions in the hollow fiber bundle, and N stands for the number of the hollow fibers contained in the shell.

The fluid separator of the present invention is preferably used as a blood dialyzer. In this case, in view of the blood treatment efficiency, it is preferred that the water permeation capacity UFR of the hollow fiber exclusive of the fin portion be in the range of from 1.0 to 30.0 ml/(m$^2$·hr·mmHg), especially 3.0 to 10.0 ml/(m$^2$·hr·mmHg).

The value y is generally called "hollow fiber filling ratio", and it is preferred that the value y be 40 to 60%. If finned hollow fibers are used, the filling ratio for attaining the predetermined blood treatment efficiency, that is, the number of the hollow fibers to be filled, can be reduced. As the number of the fins is large, the degree of the reduction is increased, so far as the value x is within the above-mentioned range. The effect is high as the number of the hollow fibers is great, though the behavior is influenced to some extent by the fin height.

This reduction of the hollow fibers in the blood treating shell is due mainly to the fact that the dialysis performance is highly improved by increase of the coefficient of the transport of the solute to the dialyzing solution at the time of the dialysis.

As is well-known, the coefficients of the transport of urea, creatine and uric acid in blood to the dialyzing solution participate in the dialysis performance. The overall solute transport coefficient Ko of the dialyzer has the following relation to the solute transport coefficient Kb in the boundary layer on the blood side, the solute transport coefficient Km in the hollow fiber membrane and the solute transport coefficient Kd in the boundary layer on the dialyzing solution side:

$$1/Ko = 1/Kb + 1/Km + 1/Kd$$

In order to increase Ko, it is necessary that means should be adopted for increasing Kb, Km and Kd.

In the blood treatment satisfying the requirement of the above formula (I) according to the present invention, when the hemodialysis is carried out at 37° C. in the state where the average flow rate of the dialyzing solution in the hollow fiber bundle-filled shell is 1.8 cm/sec, if the solute transport coefficient Kd (cm/min) of urea on the dialyzing solution side is at least 1/12, preferably at least 1/5, especially preferably at least $\frac{1}{4}$, the flow of the dialyzing solution is very uniformly distributed in the hollow fibers. This effect sufficiently covers the reduction of the effective area in the root portions of the fins and the dialysis performance of the dialyzer as a whole is much improved over the dialysis performance attained when no fins are formed on the hollow fibers.

Since fins are formed on the peripheral portions of hollow fibers, contact of the follow fibers with one another or close approaching of the hollow fibers one another is prevented and the dialyzing solution is uniformly distributed in the hollow fibers. Furthermore, the increase of the blood speed by the reduction of the number of the hollow fibers makes a contribution to the increase of Kb. Namely, Kb can be increased by increasing the blood speed in the hollow fibers, and if the number of hollow fibers is decreased in a long shell, the treatment is advantageously accomplished.

In the case where the fluid separator of the present invention is a blood dialyzer in which blood is passed through the interiors of the hollow fibers, at an ordinary blood speed of 200 cc/min, the number of hollow fibers is smaller than in an ordinary blood dialyzer and 3000 to 11000, preferably 4000 to 9000.

It is preferred that the thickness of the hollow fiber used in the present invention, except the fin portion, be small, that is, the value of Km be large. Incidentally, this hollow fiber shows a good form-retaining property at the time of the preperation or when the hollow fiber is assembled in the fluid separator or the fluid separator is actually used.

Incidentally, even in the case where finned hollow fibers are used, there is a lower limit of the hollow fiber filling ratio y represented by the above-mentioned formula (I), and if the number of the hollow fibers is too small, there is present a hollow fiber-absent space and a short circuit is formed for the dialyzing solution. It has been found that the critical limit is expressed by the left-hand side of the formula (I). On the other hand, if the ratio y is too high, insertion or filling of hollow fibers in the shell becomes difficult, and it has been found that when hollow fibers are excessively filled in the shell, a local short circuit of the dialyzing solution is formed and the dialyzing efficiency is rather reduced. This upper limit is expressed by the right-hand side of the formula (I). It has ben found that when the requirement of the formula (I) is satisfied, the finned hollow fibers show excellent effects over ordinary circular hollow fibers.

When the fluid separator of the present invention satisfying the above requirement is compared with a fluid separator comprising ordinary circular hollow fibers, the dialysis efficiency is greatly improved. For example, in case of the fluid separator of the present invention, when the average blood speed in the hollow fibers is 1.2 cm/sec, the average flow rate of the dialyzing solution outside the hollow fibers is 1.8 cm/sec and the temperature is 37° C., the solute transport coefficient Ko of urea is at least 1/15 cm/min, preferably at least 1/6 cm/min.

As the material of the hollow fiber membrane used for the fluid separator of the present invention, there can be mentioned celluloses, cellulose esters, polyamides, polyacrylonitrile, polycarbonates, polymethyl methacrylate, polyolefins, polysulfones, polyethersulfones and copolymers and mixtures thereof.

As the resin used as the partition wall, any of resins customarily used for fluid separators of this type may be used. For example, there can be preferably used a polyurethane resin and a silicone resin.

In the fluid separator of the present invention, it is preferred that the distribution of hollow fibers in at least one of sections vertical to the axial direction of the hollow fiber bundle in the partition wall of the shell to which both the ends of the hollow fiber bundle are secured by a resin should satisfy the requirement represented by the following formula (III):

$$\sigma/\bar{x} \leq 0.1 \qquad (III)$$

wherein
$\bar{x}$ stands for the average value of the number of hollow fibers present in an area of 4 mm$^2$ at optional twenty points where hollow fibers are present in said at least one section, and $\sigma$ indicates the standard deviation of said number of the hollow fibers.

At least one section vertical to the axial direction of the hollow fiber bundle in the partition wall may be any hollow fiber-present section in the partition wall to which both the end portions of the hollow fiber bundle are secured by a resin. In the blood-purifying fluid separator of the type where blood is passed through the interiors of hollow fibers, it is preferred that said at least one section be a section in the partition wall on the blood introduction side, especially a section of the blood introduction portion to which the hollow fibers are opened. In case of a dialysis type blood purifying device provided with an inlet for a dialyzing solution, it is preferred that said at least one section be one in the partition wall in the vicinity of the inlet for a dialyzing solution.

In the formula (III), $\bar{x}$ represents the average value of the number x of hollow fibers present in an area of 4 mm$^2$ at optional twenty points where hollow fibers are present in said at least one section, and $\sigma$ indicates the standard deviation of the number x of the hollow fibers. The measurement of the number x of the hollow fibers is made on the hollow fiber-present portion of the predetermined section of the partition wall, which is exposed by cutting according to need, by using a scaled optical microscope.

When the section of one hollow fiber is divided by a scale of an area of 4 mm$^2$ in the microscope, the proportion of the portion included in the scale to the entire section of the hollow fiber is calculated, and the sum of the hollow fibers included in the scale is counted. Accordingly, the value of x is not an integer but is ordinarily a number having a decimal fraction. When the value x is measured at optional twenty points in the cut section of the hollow fibers and adhesive and there is established the relation of $\sigma/\bar{x} \leq 0.1$ between the average value $\bar{x}$ and the standard deviation $\sigma$, as pointed out hereinbefore, the dialyzing efficiency of the fluid separator is increased and blood is hardly left in the separator. If the above requirement is not satisfied, vacant portions where hollow fibers are hardly present and portions where hollow fibers densely gather appear here and there, and channelling is readily caused in the blood and dialyzing solution. When the requirement of $\sigma/\bar{x} \leq 0.05$ is satisfied, the amount of the residual blood is especially reduced and excellent effects can be attained.

When the fluid separator of the present invention is used as a blood dialyzer, it is preferred that most of hollow fiber membranes be membranes of hollow fibers having at least two fins extending in the longitudinal direction on the periphery thereof and the total effective membrane area S (m$^2$), the ultrafiltration coefficient UFR (ml/m$^2$·hr·mmHg) and the urea clearance (or urea dialysance) CLU (ml/min) of the dialyzer should satisfy any of the following requirements (IV) through (VI):

(IV) UFR/S$\leq$6 and CLU/UFR$\geq$30 in case of 0.5$\leq$S$\leq$1.0, (V) UFR/S$\leq$5 and CLU/UFR$\geq$30 in case of 1.021 S$\leq$1.6, and (VI) UFR/S$\leq$4 and CLU/UFR$\geq$25 in case of 1.6<S$\leq$2.5.

In accordance with one preferred embodiment of the present invention, there is provided a fluid separator as set forth above, wherein the hollow fiber membranes are composed of a cellulose, the thickness of the membranes exclusive of the fin portions is less than 30$\mu$ and the effective membrane area is at least 0.5 m$^2$. In accordance with another preferred embodiment of present invention, there is provided a fluid separator as set forth above, wherein the hollow fiber membranes are composed of a semi-synthetic or synthetic polymer such as a cellulose ester, polymethyl methacrylate, an ethylene/vinyl alcohol copolymer, polyacrylonitrile, a polycarbonate polysulfone or a polyethersulfone, the thickness of the hollow fiber membranes exclusive of the fin portions is less than $50\mu$ and the effective membrane area is at least $0.7$ m$^2$.

If the value of UFR/S exceeds the upper limit in each case, especially if the value of UFR/S exceeds 6, control of removal of water is difficult at the dialysis and excessive removal of water is often caused. If the value of CLU/UFR is smaller than the lower limit in each of the cases (IV) to (VI), especially if the value of CLU/UFR is smaller than 25, no satisfactory dialysis effect can be attained, and wastes are gradually accumulated in the body and so-called underdialysis is often caused to occur.

Selective-permeable hollow fibers used for the fluid separator of the present invention may have a plurality of crimps according to need. It is preferred that the amplitude of the crimps be 1 to 500%, especially 20 to 200%, of the outer diameter d of the hollow fibers. If the amplitude is smaller than 1% of d, no particular effect is attained by crimping. If the amplitude exceeds 500% of d, the flow resistance in the hollow fibers is increased and when the hollow fibers are used for the blood treatment, blood is readily left in the hollow fibers. It is preferred that the wavelength of crimps in the hollow fibers of the present invention be 5 to 1000 times, especially 50 to 500 times, the outer diameter d of the hollow fibers.

If desired, in the fluid separator of the present invention, selective-permeable hollow fibers may have a plurality of fins in which the average height is substantially different in the respective fins and/or the distance between two adjacent fins is substantially different. Furthermore, selective-permeable hollow fibers have at least three fins, a plurality of selective-permeable hollow fibers are bonded together through the fins, and the average height is substantially different in the fins other than the fins bonding the hollow fibers and/or the distance between two adjacent fins is substantially different.

A hollow fiber having a plurality of fins in which the average height of the highest fin is 1.5 to 10 times, especially 2 to 5 times, the average height of the lowest fin is especially preferred because contact or close approaching is not caused in the hollow fibers, a sealed space is hardly formed between the fins or between the fin and the hollow fiber wall and the fluid can flow freely.

Furthermore, it is preferred that in a plurality of fins, the maximum value of the distance between two adjacent fins be 1.5 to 10 times, especially 2 to 5 times, the minimum value of the distance between two adjacent fins. In case of hollow fibers having such fins, in a fluid separator having these hollow fibers filled therein, contact or close approaching is hardly caused and a sealed space is hardly formed between the fins or between the fin and the hollow fiber membrane, and the flowability of the fluid outside the hollow fiber is highly improved. The distance between two adjacent fins is a shortest distance between the centers of two adjacent fins along the periphery of the outer wall of the hollow fiber.

Selective-permeable finned hollow fibers valuably used for the fluid separator of the present invention can be advantageously prepared by extruding a spinning liquid from a spinning nozzle for finned hollow fibers, which has an appropriate configuration, so that the viscosity of the liquid at the nozzle is 100 to 10,000 poise (hereinafter, referred to as P).

The spinning solution for hollow fibers is in the liquid state, and after it is extruded from the spinning nozzle, the liquid of the fin portion tends to gather toward the root because of the surface tension. In order to control this tendency, it is necessary that the viscosity of the spinning liquid at the time of extrusion from the nozzle should be increased and the time required for formation of the shape of the hollow fiber should be shortened. As the result of the research made with a view to solving this problem, it was found that in order to obtain noncircular finned hollow fibers which can be used for purification of blood and have such a shape that when used for the hemodialysis, the flow of the dialyzing solution is uniformalized and a sufficient dialyzing effect is attained without substantial reduction of the effective area of the hollow fiber membrane, it is important that the melt viscosity of the spinning liquid at the spinning nozzle should be 100 to 10,000 P.

A spinneret shown in FIG. 6 is ordinarily used for spinning of finned hollow fibers. A gas or liquid for formation of the hollow portion is extruded from a portion 1, and the spinning liquid of the hollow fiber membrane-forming material is extruded from a portion 2. Then, the extruded spinning liquid is cooled and solidified and the shape of the hollow fiber is fixed. Nozzles as shown in FIGS. 7 and 8 may be used as means for narrowing the root of the fin portion. If the viscosity of the spinning liquid is lower than 100 P, the shape of the fin is not normally fixed and the intended object is not sufficiently attained.

On the other hand, if the melt viscosity of the spinning liquid is too high and exceeds 10,000 P, the pressure loss at the extrusion hole of the spinneret is increased, and a mechanical problem arises and it is impossible to impart smooth drafting (drawing) to the extrudate. Accordingly, breaking is readily caused during spinning and the thickness unevenness is caused, and stable spinning is impossible.

It is especially preferred that the viscosity of the spinning liquid at the spinning nozzle be 300 to 2,000 P, particularly 500 to 1,500 P. If the viscosity of the spinning liquid is within this range, the shape of the fins is correctly fixed and spinning can be performed stably. In the present invention, by the viscosity of the spinning liquid at the spinning is meant the viscosity of the spinning liquid at the spinning nozzle, strictly at the outlet of the spinning nozzle.

If the time required for solidification of the extruded hollow fiber is too long even though the viscosity of the spinning liquid is within an appropriate range at the extrusion from the nozzle, deformation is promoted by the surface tension of the spinning liquid and a sharp shape cannot be given to the fin. In order to sharply fix the shape of the extrudate, it is preferred that the extrudate be promptly cooled and solidified after the extrusion. In the ordinary melt spinning, the so-called solidification point where the extrudate loses the flowability and attenuation by the winding tension is not advanced any more is apart by about 10 cm from the nozzle. However, it was found that in order to obtain a finned hollow fiber for purification of blood, as intended in the present invention, it is preferred that the solidification point be located within 40 cm from the top end of the nozzle. It is especially preferred that the distance between the solidification point and the top end of the nozzle be 5 to 40 cm, particularly 10 to 25 cm. If the distance is within this range, spinning can be performed very smoothly.

The draft ratio as another spinning condition is preferably 20 to 200 and especially preferably 40 to 100 in the present invention. If the draft ratio is within this range, a hollow fiber provided with fins having a predetermined shape can be obtained stably.

The spinning liquid used in the preparation process of the present invention is composed mainly of a thermoplastic polymer, but additives may be incorporated in the spinning liquid. As the thermoplastic polymer, there are preferably used a cellulose ester, polyethylene, polypropylene, polyethylene terephthalate, polymethyl methacrylate, and a polyether sulfone. As the additive, there can be mentioned polyols such as polyalkylene glycols, glycerol and glycols having ethylene and/or propylene chain in the molecule, plasticizers such as sulforane, caprolactone, dimethylsulfoxide and mixtures thereof, and thermoplastic polymers as mentioned above and other thermoplastic polymers. The composition of the spinning liquid is appropriately selected according to the required selective permeability and the viscosity at the spinning step.

In the process of the present invention, the selective permeability is manifested by drawing of the spun and solidified hollow fiber, extraction removal of the additives or the chemical treatment such as saponification. An appropriate treatment is selected according to the composition of the spinning liquid, but any of customary treatments may be adopted and the treatment method is not particularly critical.

The shape of size of the finned hollow fiber of the present invention is not particularly critical. The number of fins is 1 to 10 and preferably 2 to 7, and the outer diameter d is 100 to 500μ and preferably 200 to 300μ. The thickness (h) of the fin-free portion is 5 to 50μ and preferably 10 to 40μ. The height H of the fin is practically in the range of from 10 to 65μ.

In accordance with the present invention, there is provided a cellulose type hollow fiber that is very suitably used for the above-mentioned fluid separator. This fiber is a cellulose type hollow fiber having on the periphery thereof fins extended in the longitudinal direction and having a selective permeability, wherein the average degree of polymerization of a cellulose type polymer as the main constituent is at least 150 and the ratio H/W of the fin height H to the fin width W is at least 0.5.

The selective-permeable cellulose type hollow fiber of the present invention comprises a cellulose type polymer as the main constituent. As the cellulose type polymer, there can be mentioned cellulose, cellulose acetates such as cellulose diacetate and cellulose triacetate, cellulose propionate, cellulose butyrate, cellulose acetate butyrate, and cellulose nitrate. These cellulose type polymers may be used singly or in the form of a mixture of two or more of them. Cellulose and cellulose esters such as cellulose diacetate and cellulose triacetate are preferred as the cellulose type polymer.

The cellulose type polymer used in the present invention is characterized in that the average degree of polymerization is at least 150. By the average degree of polymerization referred to herein is meant a value obtained by dividing the weight mean molecular weight by the molecular weight of the recurring unit of the polymer. As means for determination of the weight mean molecular weight, there can be mentioned the gel filtration chromatography, the measurement of the coefficient of viscosity, the measurement of the sedimentation equilibrium and the light scattering method.

If the average degree of polymerization of the cellulose type polymer is lower than 150, a selective-permeable cellulose type hollow fiber having fins having a large height can hardly be obtained, and a hollow fiber having a low re-wet elongation can hardly be obtained. It is preferred that the average degree of polymerization be at least 160, especially at least 170. The upper limit of the average degree of polymerization is not particularly critical, but from the practical viewpoint, it is preferred that the degree of polymerization be lower than 230, especially lower than 200.

The cellulose type hollow fiber of the present invention comprises as the main constituent a cellulose type polymer as described above. The content of the cellulose type polymer is at least 50%, preferably at least 70%. Other component is not particularly critical, and for example, there can be mentioned organic polymers such as polymethyl methacrylate, polyethylene, polypropylene, polyacrylonitrile, and polyvinyl alcohol.

The cellulose type hollow fiber of the present invention has on the periphery thereof fins extended in the longitudinal direction, and the hollow fiber is characterized in that the ratio H/W of the fin height H to the fin width W is at least 0.5. If the ratio H/W is lower than 0.5, contact of hollow fibers with one another can hardly be prevented when they are filled in the fluid separator. It is preferred that the ratio H/W be at least 0.8. Incidentally, the fin width W is the width of the fin at a position of ½ of the fin height H.

The number x of fins in the hollow fiber of the present invention is at least 1. However, if the number x is 11 or larger, reduction of the effective membrane area at the root portions of the fins becomes prominent, and the solute dialyzing capacity and water permeability of the blood dialyzer are drastically reduced. Accordingly, the number x is generally in the range of from 1 to 10, and it is preferred that the number x be 2 to 8, especially 3 to 7.

It is preferred that the outer diameter d of the hollow fiber of the present invention be 100 to 400μ, especially 200 to 300μ, and that the thickness h of the fin-free portion of the hollow fiber be 5 to 50μ, especially 5 to 30μ, particularly especially 10 to 25μ. Furthermore, it is preferred that the fin height H be 5 to 100μ, especially 9 to 60μ, and that the ratio H/d be 0.5 to 3, especially 1 to 2. Moreover, it is preferred that the ratio H/d of the average height H (μ) of fins to the average outer diameter d of the hollow fiber exclusive of the fin portion be 0.01 to 1, especially 0.02 to 0.5, particularly especially 0.03 to 0.2.

It is preferred that the width of the root portion of the fin be narrower than that of the upper portion. However, ordinarily, the root portion is readily expanded by the surface tension of the spinning liquid after extrusion of the spinning liquid from the nozzle. The width of the root portion is 15 to 50μ and preferably 20 to 40μ.

If the width of the root portion is within this range, the circularity of the hollow fiber is good and coagulation of blood is hardly caused in the hollow fiber or blood is hardly left in the hollow fiber. If one hollow fiber has a plurality of fins, the respective fins may be the same or different in the height H or width W. Furthermore, at least parts of the fins may be spirally extended on the outer surface of the hollow fibers, or the fins may be partially discontinuous.

The hollow fiber of the present invention is characterized in that the re-wet elongation is lower than 3%. If the re-wet elongation exceeds 3%, when the hollow fiber is filled in the fluid separator in the substantially dry state and is then re-wetted with water or an aqueous solution, the hollow fiber is excessively elongated, with the result that local contact or close approaching is caused among hollow fibers and the hollow fibers are readily bent or curved. It is preferred that the re-wet elongation be lower than 2.5%. The lower limit of the re-wet elongation is not particularly critical, but if the re-wet elongation is higher than 0.5%, especially higher than 1%, the hollow fiber shows an appropriate elongation when re-wetted in the fluid separator and the hollow fiber bundle is expanded throughout the fluid separator. Incidentally, the re-wet elongation $\alpha$ is determined by measuring the length $l$ of the hollow fiber in the substantially dry state under a load of about 0.1 g/de, measuring the length $l_1$ of the hollow fiber in the wet state under a load of about 0.01 g/de and making the calculation according to the formula of $$\alpha = \frac{l_1 - l}{l} \times 100.$$

The substantially dry state means a state of a glycerol content of 30 to 60% and a water content of 0.5 to 30%, preferably 0.5 to 9%, which is produced by immersing the hollow fiber in an aqueous solution of glycerol and then drying the hollow fiber.

It is preferred that the wet tensile strength of the hollow fiber of the present invention be at least 0.3 g/de, the shape-retaining property is poor, and the hollow fiber is readily broken in the preparation process or at the step of assembling the fluid separator. This phenomenon is especially prominent when the outer diameter d is 100 to 300μ and the thickness is 5 to 25μ. The upper limit of the wet tensile strength is not particularly critical. For example, the wet tensile strength is ordinarily up to 0.8 g/de.

In the hollow fiber of the present invention, it is preferred that the flexural rigidity in the substantially wet state be at least 200 mg/200 fibers, and that the rupture pressure as the factor indicating the pressure resistance when the interior of the hollow fiber in the wet state is compressed be at least 4 kg/cm². If the flexural rigidity and rupture pressure are within the above-mentioned ranges, handling of hollow fibers is facilitated at the step of assembling the fluid separator, the lengths of the hollow fibers are readily uniformalized in the fluid separator and the hollow fibers are hardly broken while the fluid separator is actually operated under compression.

The cellulose type hollow fiber of the present invention has a selective permeability to fluids. For example, when the cellulose type hollow fiber is used for the hemodialysis, it is preferred that the water permeation capacity UFR of the hollow fiber exclusive of the fin portion be 1.0 to 30.0 ml/(m²·hr·mmHg), especially 3.0 to 10.0 ml/(m²·hr·mmHg).

The cellulose type hollow fiber of the present invention having such a selective permeability exerts an excellent capacity in the fluid separation. The fluid separation is not particularly critical. For example, there can be mentioned the liquid separation such as dialysis, ultrafiltration and reverse osmosis, and the gas separation for an artificial lung. The hollow fiber of the present invention is especially suitable for the separation utilizing the difference of the diffusion speed, such as the dialysis in which a good flow state of the fluid outside the hollow fiber is required, or the blood treatment in which smooth flowing within the hollow fiber is necessary. In the hollow fiber of the present invention, other membrane having a fluid separating capacity may be formed as a supporting membrane on the inner or outer membrane surface.

The process for the preparation of the cellulose type hollow fiber according to the present invention is characterized in that a liquid mixture comprising a cellulose ester polymer having an average degree of polymerization of at least 150 and other additives is used as the spinning liquid, and the spinning liquid is extruded together with a core agent from a spinneret for a finned hollow fiber in the state where the viscosity is in the range of from 100 to 10,000 P. It is preferred that the viscosity be 200 to 5,000 P, especially 500 to 3,000 P, in case of melt spinning, and the viscosity be 200 to 5,000 P in case of semi-dry semi-wet spinning or wet spinning. The melt viscosity is measured by using a flow tester, and the liquid viscosity is measured by a rotational viscometer.

Any of melt spinning, wet spinning and semi-dry semi-wet spinning can be adopted as the preparation process. In case of the melt spinning process, the spinning liquid is a heated melt, and the melt is extruded from the spinneret and cooled to form a solidified finned hollow fiber. Then, at least a part of the additive in the finned hollow fiber is extracted and removed by a solvent incapable of dissolving the cellulose ester polymer but capable of dissolving the additive, and if necessary, the hollow fiber is subjected to an alkali treatment. Thus, a finned cellulose type hollow fiber having a selective permeability can be obtained. In this melt spinning process, if the time required for substantial solidification of the hollow fiber by cooling from the point of extrusion of the heated solution from the spinneret is less than 10 seconds, less than 5 seconds, spinning can be performed stably while retaining a good shape of the fin. By the term "solidification" used herein is meant the state where the spun fiber loses the flowability and attenuation is not advanced any more by the winding tension. The solidification is determined by taking out a fiber being spun by a clipper and measuring the point of termination of the attenuation.

A specific example of the melt spinning process will now be described. A heated spinning liquid (melt or solution) is extruded in a gas or spinning bath according to customary procedures, for example, from a hollow hole of a spinneret having a notch in the periphery of a double annular portion, and spinning is conducted while retaining the hollow portion by filling a gas or liquid substantially incapable of dissolving the membrane material or reacting therewith into the central hollow portion. For example, a plasticizer such as polyethylene glycol is added as the additive to flakes of cellulose diacetate, and the mixture is molten and the melt is extruded into air from a hollow hole of the spinning nozzle. Then, nitrogen gas is blown into the central portion and simultaneously, the extrudate is cooled. The plasticizer is removed from the obtained hollow fiber extrudate. If necessary, a saponification treatment is carried out with caustic soda. Thus, a finned hollow fiber having a solute selective permeability is prepared.

As the plasticizer, there can be mentioned polyalkylene glycols such as polyethylene glycol, glycols having an ethylene/propylene chain in the molecule, glycerol, diglycerol, sulforanes, caprolactones, and dimethylsulfoxide. The amount of the plasticizer added to the spinning solution is appropriately determined according to the intended use of the hollow fiber. For example, when the hollow fiber is used for the hemodialysis, it is preferred that the amount of the plasticizer be 20 to 70% by weight, especially 25 to 60% by weight.

When the wet spinning or semi-dry semi-wet spinning process if adopted for the preparation of the hollow fiber of the present invention, the additive comprises a solvent for the cellulose ester polymer, and the spinning solution is extruded from the spinneret and immersed in a coagulating bath. In order to form pores in the hollow fiber membrane with ease, it is preferred that a poor solvent for the cellulose type polymer or a metal salt be added as the pore-forming agent to the above-mentioned additive. In this spinning process, it is preferred that the time of from the point of the extrusion from the spinneret to the point of immersion in the coagulating bath be up to 5 seconds, especially up to 1 second. The kinds and amount of the solvent, the poor solvent and the metal salt and the compositions of the coagulating solution and the core agent may be appropriately selected according to the intended use of the hollow fiber membrane. A cheap solvent capable of dissolving the cellulose type solvent may be used as the solvent, and a solvent hardly capable of dissolving the cellulose type polymer may be used as the poor solvent.

In the process for the preparation of the hollow fiber of the present invention, it is sometimes preferred that the spinning be carried out at a winding speed higher than the extrusion speed. In this case, it is preferred that the draft ratio be 30 to 200 in case of the melt spinning process and 5 to 50 in case of the wet or semi-dry semi-wet spinning process. In the case of the melt spinning, the draft ratio refers to that before the solidification of the spun filament. Optionally, the spun filament may further be drafted after the solidification thereof, but usually, such further drafting is not necessary.

The fluid separator of the present invention can be used for the liquid separation such as dialysis, ultrafiltration, precision filtration and reverse osmosis, and the gas separation such as oxygen enriching and artificial lung. The fluid separator of the present invention is suitable as a body fluid treatment device such as an artificial kidney, an artificial liver, a plasma separating device, an abdominal dropsy tapping device or an artificial lung and is especially suitable as a blood dialyzer.

The present invention will now be described in detail with reference to the following examples that by no means limit the scope of the invention.

EXAMPLES 1 THROUGH 8 AND COMPARATIVE EXAMPLES 1 THROUGH 4

To 100 parts of cellulose diacetate was added 50 parts of polyethylene glycol (having a molecular weight of 200), and the mixture was molten at 230° C. and the melt was spun from a spinneret for a finned hollow fiber and also from an ordinary annular fin-free spinneret. After cooling, the extrudates were immersed in a 2% aqueous sodium hydroxide solution at 70° C. to saponify them. Then, they were washed with water, immersed in an approximately 50% aqueous glycerol solution, and dried with hot air to obtain circular finned hollow fibers and circular fin-free hollow fibers shown in Table 1. In each of these fibers, in a wet state, the inner diameter was about 200μ and the thickness of the fin-free portion was 22 to 25μ.

A predetermined number, shown in Table 1, of the so-obtained hollow fibers were filled into a circular tube shell at a occupancy ratio y to construct a blood dialyzer, and the in vitro ultrafiltration performance and dialysis performance were measured. Furthermore, the easiness or difficulty of the operation of filling the fibers into the shell was checked.

The dialysis performance (dialysance) 1/Kd was measured at 37° C. under such conditions that the average flow rate of blood in the hollow fibers was 1.2 cm/sec and the average flow rate of the dialyzing solution was 1.8 cm/sec. The obtained results were shown in Table 1. From these results, it is seen that the hollow fiber of the present invention provides a blood purifier having highly improved ultrafiltration performance and dialysis performance and has a good adaptability to insertion in the shell.

Incidentally, 1/Kd was determined in the following manner. Namely, 1/Ko was calculated according to the following equation:

$$1/Ko = \frac{(1 - Q_b/Q_d)A}{Q_b \ln\left(\frac{1 - D_a/Q_d}{1 - D_a/Q_b}\right)}$$

wherein

Qb stands for the flow rate (cm³/min) of blood side, Qd stands for the flow rate (cm³/min) of the dialyzing solution side, Da stands for the dialysance measured according to the dialyzer performance evaluation standard stipulated at the meeting of the Japanese Artificial Organ Association held in September 1982, and A stands for the effective membrane area (cm²) of the hollow fiber, that is, the membrane area based on the inner diameter in the wet state, exclusive of the root portion of the fin, not participating in the transport of the solute, in case of the finned hollow fiber.

The measurement of 1/Km+1/Kb was carried out in a manner of a model under such conditions that 1/Kd was substantially zero. The value 1/Kd of the blood purifier was calculated from the equation of $$1/Kd = 1/Ko - (1/Km + 1/Kb).$$

EXAMPLES 9 THROUGH 11

In the same manner as described in Example 1, 132 parts of polyethylene glycol (having a molecular weight of 200) was added to 100 parts of cellulose diacetate, the spinning liquid was spun into circular hollow yarns having three fins and the polyethylene glycol was dissolved out and removed by the hot water treatment. Then, the filaments were washed with hot water, immersed in an aqueous glycerol solution, and dried with hot air to obtain hollow fibers for the dialysis. In the so-obtained hollow fibers, the inner diameter was about 200μ and the membrane thickness of the fin-free portion was about 25μ. Dialyzers were assembled by using these hollow fibers as indicated in Table 1, and the measurement was conducted in the same manner as described in Example 1. The obtained results are shown in Table 1.

TABLE 1

| Example No. | Number of Fins | α | W (μ) | Number of Hollow Fibers | Y (%) | Effective Membrane Area (m²) | UFR | 1/K_D (cm/min) | Urea Dialysance (ml/min) | Adaptability to Insertion |
|---|---|---|---|---|---|---|---|---|---|---|
| Example 1 | 1 | 0.14 | 28 | 10,300 | 53 | 1.3 | 5.2 | 8 | 160 | good |
| Example 2 | 3 | 0.14 | 28 | 9,000 | 48 | 1.1 | 4.4 | 5 | 167 | good |
| Example 3 | 6 | 0.14 | 28 | 8,500 | 44 | 0.95 | 3.8 | 2 | 168 | good |
| Example 4 | 10 | 0.14 | 28 | 7,800 | 40 | 0.82 | 3.3 | 1 | 165 | good |
| Example 5 | 3 | 0.06 | 25 | 9,000 | 48 | 1.1 | 4.4 | 8 | 163 | good |
| Example 6 | 3 | 0.18 | 30 | 9,000 | 48 | 1.1 | 4.4 | 4 | 165 | good |
| Example 7 | 6 | 0.14 | 28 | 7,000 | 36 | 0.74 | 3.0 | 10 | 160 | good |
| Example 8 | 3 | 0.14 | 28 | 11,000 | 58 | 1.3 | 5.3 | 3 | 169 | good |
| Example 9 | 3 | 0.12 | 20 | 9,700 | 46 | 0.87 | 5.1 | 7 | 168 | good |
| Example 10 | 3 | 0.12 | 30 | 9,000 | 48 | 1.1 | 5.5 | 6 | 159 | good |
| Example 11 | 3 | 0.12 | 30 | 9,000 | 48 | 1.1 | 6.0 | 7 | 160 | good |
| Comparative Example 1 | 0 | — | — | 9,000 | 48 | 1.2 | 4.8 | 17 | 145 | good |
| Comparative Example 2 | 3 | 0.14 | 28 | 6,800 | 35 | 0.8 | 3.2 | 21 | 142 | good |
| Comparative Example 3 | 3 | 0.14 | 28 | 12,000 | 62 | 1.4 | 5.6 | 18 | 148 | bad |
| Comparative Example 4 | 12 | 0.14 | 28 | 7,800 | 40 | 0.6 | 2.4 | 10 | 152 | good |

EXAMPLE 12 THROUGH 14

The procedure as in Example 9 was repeated, but using a different spinneret, to obtain circular hollow fibers having six fins and a membrane thickness of the fin-free portion of about 15μ. Dialyzers were assembled by using the hollow fibers as indicated in Table 1, and the measurement was conducted to obtain the results as shown in Table 1.

TABLE 2

| Example No. | Number of Fins | α | W (μ) | Number of Hollow Fibers | Y (%) | Effective Membrane Area (m²) | UFR | 1/K_D (cm/min) | Urea Dialysance (ml/min) | Adaptability to Insertion |
|---|---|---|---|---|---|---|---|---|---|---|
| Example 12 | 6 | 0.06 | 25 | 12,000 | 45 | 1.5 | 8.5 | 4 | 170 | good |
| Example 13 | 6 | 0.10 | 30 | 12,000 | 45 | 1.5 | 8.0 | 5 | 173 | good |
| Example 14 | 6 | 0.15 | 35 | 12,000 | 45 | 1.5 | 7.4 | 5 | 175 | good |

EXAMPLES 15 THROUGH 19 AND COMPARATIVE EXAMPLES 5 THROUGH 7

To 100 parts of cellulose diacetate was added 50 parts of polyethylene glycol (having a molecular weight of 300), and the mixture was molten at 230° C. and spun from spinnerets for hollow fibers having 3 or 6 fins and an ordinary fin-free annular spinneret. The post treatments were carried out in the same manner as described in Example 1. Thus, hollow fibers having 3 or 6 fins and fin-free hollow fibers were prepared. In each of these hollow fibers, the inner diameter was 200μ and the membrane thickness was 25μ. In the finned hollow fibers, the fin height was 35μ. These hollow fibers were saponified to obtain hollow fiber membranes.

Three kinds of the so-obtained hollow fibers were filled in shells having the same size at filling ratios shown in Table 3 to assemble dialyzers. The in vitro dialysis performance was determined. Furthermore, bovine blood was diffused in the dialyzers and after removal of blood, the amounts of blood left in the dialyzers were measured. Moreover, with respect to 50 assembled dialyzers, the number of the dialyzers where leaking (tube plate leak) was caused by minute spaces formed in the non-bonded portions among the hollow fibers in the partition wall was checked. The obtained results are shown in Table 3.

In checking the leaking, water was filled on the dialyzing solution side, an air pressure of 0.5 K was applied to the blood side, and formation of bubbles was examined.

Incidentally, the urea clearance was determined according to the dialyzer performance evaluation standard specified at the meeting of the Japanese Artificial Organ Association held in September 1982. The urea clearance was 160 to 167 in Examples 15 through 19, while the urea clearance was 155 to 158 in Comparative Examples 5 through 7.

From the results shown in Table 3, it was found that the dialysis performance is improved according to the present invention and the amount of blood left after diffusion can be reduced according to the present invention. Moreover, it was confirmed that in the dialyzer of the present invention, occurrence of leaking by minute spaces in the adhesive-bonded tube plate of the partition wall is prevented.

TABLE 3

| | Number of Fins | Occupancy Ratio (%) | σ/x̄ | Amount (ml) of Residual Blood | Tube Plate Leak Ratio (%) |
|---|---|---|---|---|---|
| Example 15 | 1 | 53 | 0.09 | 0.4 | 1.9 |
| Example 16 | 3 | 50 | 0.07 | 0.3 | 0 |
| Example 17 | 3 | 46 | 0.08 | 0.3 | 0.5 |
| Example 18 | 6 | 47 | 0.05 | 0.1 | 0 |
| Example 19 | 6 | 40 | 0.06 | 0.2 | 0 |
| Comparative Example 5 | 0 | 53 | 0.15 | 1.1 | 8.0 |
| Comparative Example 6 | 1 | 53 | 0.12 | 0.8 | 5.1 |
| Comparative Example 7 | 3 | 46 | 0.11 | 0.9 | 4.5 |

EXAMPLES 20 THROUGH 28 AND COMPARATIVE EXAMPLES 8 THROUGH 10

To 100 parts of cellulose diacetate was added 45 parts of polyethylene glycol (having a molecular weight of 400), and the mixture was molten at 220° C. and spun through spinnerets for circular hollow fibers or finned performance was measured. The obtained results are shown in Table 4.

TABLE 4

| | Membrane Thickness (μ) of Fin-Free Portion in West State | Number of Fins | S (m²) | UFR | CLU | CLU/UFR | Occupancy Ratio (%) |
|---|---|---|---|---|---|---|---|
| Comparative Example 8 | 20 | 0 | 0.8 | 6.0 | 150 | 25.0 | 55 |
| Example 20 | 20 | 3 | " | 4.5 | 162 | 36.0 | 50 |
| Example 21 | 20 | 6 | " | 4.0 | 165 | 41.3 | 45 |
| Example 22 | 20 | 8 | " | 3.8 | 166 | 43.7 | 42 |
| Comparative Example 9 | 20 | 0 | 1.8 | 12.1 | 175 | 14.5 | 55 |
| Example 23 | 20 | 3 | " | 7.0 | 180 | 25.7 | 50 |
| Example 24 | 20 | 6 | " | 6.4 | 183 | 28.6 | 45 |
| Example 25 | 20 | 8 | " | 6.0 | 183 | 30.5 | 42 |
| Comparative Example 10 | 25 | 0 | 1.2 | 6.5 | 168 | 25.8 | 55 |
| Example 26 | 25 | 3 | " | 5.8 | 175 | 30.2 | 50 |
| Example 27 | 25 | 6 | " | 5.5 | 178 | 32.4 | 45 |
| Example 28 | 25 | 8 | " | 5.3 | 180 | 34.0 | 42 |
| Comparative Example 11 | 35 | 0 | 0.8 | 3.0 | 120 | 40.0 | 50 |
| Example 29 | 25 | 6 | " | 3.5 | 145 | 41.4 | 45 |
| Comparative Example 12 | 55 | 0 | 0.8 | 2.5 | 113 | 45.2 | 50 |
| Example 30 | 40 | 6 | 0.8 | 3.5 | 135 | 42.2 | 45 | hollow fibers. The spun hollow fibers were saponified by sodium hydroxide to convert cellulose diacetate to cellulose, and the saponified fibers were wound. The membrane thickness (in the wet state) of the fin-free portion and the number of fins were as shown in Table 4. These factors were adjusted based on the kind of the spinneret and the extrusion rate. The so-obtained cellulose hollow fibers were filled in shells differing in the size, and the in vitro UFR and urea clearance CLU were determined. The obtained results are shown in Table 4. The values of UFR and clearance CLU were obtained according to the standard of the Japanese Artificial Organ Association. From the results shown in Table 4, it was found that in the dialyzer according to the present invention, the clearance is high and UFR is at an appropriate level, even if the membrane area is small. Namely, in the dialyzer according to the present invention, a good balance is maintained between the clearance and UFR and the dialysis performance is high.

EXAMPLE 29 AND COMPARATIVE EXAMPLE 11

Hollow fibers shown in Table 4 were prepared in the same manner as described in Example 20, and blood dialyzers having an effective area of 0.8 m² were assembled by using these hollow fibers. With respect to each dialyzer, the in vitro performance was determined. The obtained results are shown in Table 4. From the results shown in Table 4, it was found that in case of fin-free hollow fibers having a membrane thickness of 35μ, as prepared in Comparative Example 11, the dialysis performance is low and the dialyzer has no practical utility.

EXAMPLE 30 AND COMPARATIVE EXAMPLE 12

To 100 parts of cellulose diacetate were added 140 parts of polyethylene glycol and diglycerol, and the mixture was molten at 200° C. and spun through spinnerets for circular or finned hollow fibers. The plasticizer was extracted by hot water. The hollow fibers were filled in shells differing in the size and the in vitro

EXAMPLE 31

To 100 parts of cellulose diacetate were added 230 parts of polyethylene glycol (having a molecular weight of 200) and diglycerol, and the mixture was molten at 190° C. and the melt was spun through a spinneret having an annular double slit for finned hollow fibers while introducing nitrogen gas into the core portion. In the obtained finned hollow fibers, the inner diameter was about 200μ, the membrane thickness of the fin-free portion was about 25μ, the fin height was about 35μ, the fin root width was about 25μ and the number of fins was 6.

The finned hollow fibers were bundled and supplied on a metal net having an opening size of 5 mm, and on this metal net, the polyethylene glycol and diglycerol were extracted by hot water to obtain a crimped finned hollow fiber bundle in which the amplitude was about 200μ, the wavelength was about 15 mm and the minimum radius of curvature was about 25 mm.

A blood dialyzer having a filling ratio of about 50% and an effective membrane area of about 1 m² was assembled by using this hollow fiber bundle, and the in vitro ultrafiltration performance and dialysis performance were measured. Furthermore, the state of coagulation of blood and the amount of the residual blood were checked. The obtained results are shown in Table 5.

EXAMPLES 32 AND 33

Finned hollow fibers before the crimping treatment, which were obtained in the same manner as described in Example 31, were subjected to hot water extraction on a metal net having an opening size of 3 mm or 10 mm, to obtain a hollow fiber bundle having an amplitude of about 80μ, a wavelength of about 10 mm and a minimum curvature radius of about 15 mm or a hollow fiber bundle having an amplitude of about 300μ, a wavelength of about 30 mm and a minimum curvature radius of about 30 mm. In the same manner as described in Example 31, blood analyzers were assembled by using these hollow fiber bundles and the characteristics were determined. The obtained results are shown in Table 5.

TABLE 5

| Example No. | UFR (ml/m² · hr · mmHg) | Urea Dialysance (ml/min) | Coagulation of Blood | Amount (ml) of Residual Blood |
| --- | --- | --- | --- | --- |
| 31 | 4.3 | 175 | not caused | 0.13 |
| 32 | 4.0 | 178 | not caused | 0.15 |
| 33 | 4.7 | 173 | not caused | 0.10 |

EXAMPLES 34 AND 35

To 100 parts of cellulose diacetate was added 50 parts of polyethylene glycol (having a molecular weight of 300), and the mixture was molten at 200° C. and spun through a spinneret having an annular double slit provided with such notches and connecting portions as giving finned hollow fibers having fin height and distance shown in Table 6. Then, the hollow fibers were saponified to convert cellulose diacetate to cellulose, followed by winding. Blood dialyzers having an effective membrane area of about 1 m² were assembled by using these hollow fibers. The configurations of the hollow fibers and the performance characteristics of the dialyzers were as shown in Table 6.

TABLE 6

| | Example 34 | Example 35 |
| --- | --- | --- |
| Number of Fins | 3 | 4 |
| Maximum Fin Height ($\mu$) | 35 | 40 |
| Minimum Fin Height ($\mu$) | 10 | 15 |
| Maximum Distance ($\mu$) between Two Adjacent Fins | 100 | 100 |
| Minimum Distance ($\mu$) between Two Adjacent Fins | 350 | 400 |
| Occupancy Ratio (%) in Dialyzer | 50 | 45 |
| Urea Dialysance of Dialyzer | 173 | 175 |
| Tube Plate Leak Ratio (%) | 1.2 | 0.8 |

EXAMPLES 36 THROUGH 46 AND COMPARATIVE EXAMPLES 13 AND 14

To 100 parts of cellulose diacetate was added polyethylene glycol (hereinafter referred to as "PEG") (having a molecular weight of 300) in an amount shown in Table 6, and the mixture was molten at 200 to 240° C. and extruded at a temperature shown in Table 7 at the extrusion opening through a nozzle shown in FIG. 6 (the inner diameter of the annular double slit was 1.6 mm, the outer diameter was 2 mm, the knotch width was 0.15 mm and the knotch height was 0.7 mm). The extrudate was cooled by air fed at a rate shown in Table 7 at room temperature, followed by winding.

The melt viscosity of the polymer melt at each temperature was separately measured by a flow tester.

The distance between the solidification point and the top end of the nozzle was measured while clipping the fiber being spun by a clipper, and the point where attenuation terminates was regarded as the solidification point. At a nozzle temperature of 190° C., the viscosity of the polymer melt was too high and yarn breakage was readily caused, and hence, winding could not be carried out smoothly.

Hollow fibers wound were saponified by an alkali to convert cellulose diacetate to cellulose and obtain finned hollow fibers as shown in FIG. 6 (the thickness of the fin-free portion was about 20 to about 25$\mu$). Dialyzers were assembled by filling these hollow fibers in shells at substantially the same filling ratio. The in vitro dialysis performance was determined. The obtained results are shown in Table 7.

In the hollow fibers obtained according to the present invention, the shape of the fins was sharp and the width of the root portion of the fins was narrow, and the dialyzer comprising the hollow fibers of the present invention had a high performance value. On the other hand, in case of the comparative hollow fibers outside the scope of the present invention, the shape of the fins was rounded and fins having a sufficient height could not be formed.

TABLE 7

| No. | Amount (parts) of PEG | Nozzle Temperature (°C.) | Viscosity (P) at Nozzle | Distance (cm) between Nozzle and Solidification Point | Draft Ratio | Feed Rate (m/sec) of Cooling Air | H ($\mu$) | W ($\mu$) | Urea Clearance in Dialyzer |
| --- | --- | --- | --- | --- | --- | --- | --- | --- | --- |
| Example 36 | 50 | 200 | 2900 | 12 | 60 | 0.5 | 45 | 24 | 168 |
| Example 37 | 50 | 210 | 1500 | 15 | 60 | 0.5 | 42 | 30 | 168 |
| Example 38 | 50 | 220 | 980 | 26 | 60 | 0.5 | 37 | 35 | 165 |
| Example 39 | 50 | 225 | 550 | 29 | 60 | 0.5 | 26 | 42 | 162 |
| Example 40 | 50 | 230 | 450 | 38 | 60 | 0.5 | 20 | 50 | 160 |
| Example 41*[1] | 50 | 210 | 1500 | 20 | 108 | 0.5 | 40 | 32 | 165 |
| Example 42 | 30 | 200 | 5000 | 10 | 60 | 0.5 | 40 | 28 | 167 |
| Example 43 | 120 | 220 | 200 | 35 | 60 | 0.5 | 28 | 40 | 160 |
| Example 44 | 50 | 225 | 550 | 25 | 60 | 1.0 | 36 | 35 | 164 |
| Example 45 | 50 | 225 | 550 | 18 | 60 | 2.0 | 40 | 30 | 166 |
| Example 46 | 50 | 225 | 550 | 43 | 60 | 0*[3] | 18 | 50 | 150 |
| Comparative Example 13*[2] | 50 | 190 | 11000 | — | 60 | 0.5 | — | — | — |
| Comparative Example 14 | 50 | 240 | 80 | 45 | 60 | 0.5 | 15 | 50 | 147 |

Note
*[1]spinneret having a large nozzle was used
*[2]yarn breakage was caused
*[3]atmosphere was heated at about 50° C.

EXAMPLES 47 THROUGH 50 AND COMPARATIVE EXAMPLES 15 AND 16

In the same manner as described in Example 36, a polymer shown in Table 8 was melt-spun and the spun fibers were drawn to render them finely porous. Hollow fibers provided with fins having configurations shown in Table 8 were obtained.

TABLE 8

| | Polymer | Nozzle Temperature (°C.) | Viscosity (P) at Nozzle | Distance (cm) between Nozzle and Solidification Point | H (μ) | W (μ) |
|---|---|---|---|---|---|---|
| Example 47 | Polyethylene | 200 | 560 | 16 | 38 | 28 |
| Example 48 | Polyethylene | 210 | 450 | 28 | 30 | 30 |
| Comparative Example 15 | Polyethylene | 220 | 85 | 45 | 15 | 54 |
| Example 49 | Polypropylene | 220 | 680 | 18 | 42 | 25 |
| Example 50 | Polypropylene | 230 | 510 | 30 | 32 | 32 |
| Comparative Example 16 | Polypropylene | 240 | 90 | 45 | 13 | 50 |

EXAMPLE 51

To 100 parts of cellulose diacetate (having an average polymerization degree of 170) was added 50 parts of polyethylene glycol (having a molecular weight of 200), and the mixture was molten at 230° C. and was extruded through an annular double slit for finned hollow fibers while introducing nitrogen gas into the core portion. The spun fibers were immersed in hot water to dissolve out the polyethylene glycol. Then, the saponification was carried out with an aqueous solution of sodium hydroxide and the fibers were immersed in an aqueous solution containing glycerol at a concentration of 80% by weight and were then dried by hot air to obtain finned hollow fibers for the hemodialysis, which had an inner diameter of about 200μ, a fin-free portion thickness of about 18 to 30μ and 6 fins having configurations shown in Table 8. The re-wet elongation, the tensile strength in the wet state, the flexural rigidity and the rupture pressure of the hollow fibers were as shown in Table 9.

The so-obtained hollow fibers were filled in a circular tube shell to assemble a blood dialyzer having an effective membrane area and filling ratio shown in Table 9. The in vitro ultrafiltration performance and dialysis performance and the amount of the residual blood were measured. The obtained results are shown in Table 9.

EXAMPLES 52 THROUGH 54

Spinning was carried out in the same manner as described in Example 51 by using cellulose diacetate having an average degree of polymerization of 160, 180 or 200 to obtain hollow fibers having 6 fins having configurations shown in Table 9. Blood dialyzers were assembled in the same manner as described in Example 51. The characteristics of the hollow fibers and blood dialyzers were measured. The obtained results are shown in Table 9.

COMPARATIVE EXAMPLES 17 AND 18

Hollow fibers and blood dialyzers were prepared in the same manner as described in Example 52 by using cellulose diacetate having a degree of polymerization of 120 or 140. The characteristics of the hollow fibers and dialyzers were measured. The obtained results are shown in Table 9.

EXAMPLES 55 AND 56 and COMPARATIVE EXAMPLE 19

To 100 parts of cellulose diacetate (having an average degree of polymerization of 180) were added 135 parts in total of polyethylene glycol and diethylene glycol, and the mixture was molten at 200° C. and extruded through a spinneret having an annular double slit for finned hollow fibers. The plasticizer was dissolved out by hot water. Thus, there were obtained hollow fibers in which the inner diameter was 205μ, the thickness of the fin-free portion was 12 to 15μ and the number of fins was 6. Blood dialyzers were assembled by using these hollow fibers. The characteristics of the hollow fibers and dialyzers were measured. The obtained results are shown in Table 9.

TABLE 9

| | Example 51 | Example 52 | Example 53 | Example 54 | Comparative Example 17 | Comparative Example 18 | Example 55 | Example 56 | Comparative Example 19 |
|---|---|---|---|---|---|---|---|---|---|
| Fin Height (μ) (H) | 26 | 20 | 28 | 35 | 13 | 13 | 10 | 8 | 6 |
| Fin Width (μ) (W) | 20 | 25 | 20 | 18 | 30 | 28 | 15 | 12 | 15 |
| Re-wet Elongation (%) | 1.5 | 1.8 | 1.2 | 0.8 | 3.5 | 3.2 | 0.5 | 0.6 | 0.8 |
| Wet Strength (g/de) | 0.5 | 0.45 | 0.53 | 0.58 | 0.30 | 0.35 | 0.6 | 0.6 | 0.5 |
| Flexural Rigidity (wet) (mg) | 250 | 220 | 250 | 280 | 180 | 170 | 400 | 340 | 350 |
| Rupture Pressure (wet) (kg/cm$^2$) | 4.3 | 4.0 | 4.8 | 5.5 | 3.0 | 3.4 | 4.5 | 4.0 | 4.2 |
| Effective Membrane Area (m$^2$) | 1.10 | 1.15 | 1.03 | 0.96 | 1.20 | 1.20 | 1.20 | 1.20 | 1.20 |
| Occupancy Ratio (%) | 46 | 48 | 43 | 40 | 50 | 50 | 45 | 45 | 50 |
| UFR (ml/mmHg · hr) | 4.8 | 5.0 | 4.5 | 4.0 | 6.0 | 5.4 | 6.5 | 7.0 | 6.5 |
| Dialysance (ml/min) | 168 | 167 | 170 | 170 | 163 | 164 | 165 | 168 | 158 |
| Amount (ml) of Residual Blood | below 0.1 | below 0.1 | below 0.1 | below 0.1 | 0.3 | 0.3 | below 0.1 | below 0.1 | 0.2 |
| Coagulation of Blood | not caused | not caused | not caused | not caused | slight | slight | not caused | not caused | not caused |

We claim:

1. A fluid separator having a fluid inlet and fluid outlet comprising a shell filled with a bundle of hollow fibers having a selective permeability, wherein a majority of the hollow fibers each has on the periphery thereof 1 to 10 fins extending in the longitudinal direction, and the occupancy ratio y of the sections, defined by the peripheries, of all the hollow fibers exclusive of the fin portions in the hollow fiber bundle to the section, vertical to the axial direction of the hollow fiber bundle, of the inner wall of the shell is within a range defined by the following formula (I):

$$41 - 3.1\sqrt{\alpha x} \leq y \leq 61 - 3.1\sqrt{\alpha x} \qquad (I)$$

wherein x stands for the average fin number per hollow fiber in the hollow fiber bundle, and $\alpha$ indicates the ratio H/d of the average fin height H ($\mu$) in the hollow fiber bundle to the average outer diameter d ($\mu$) of the hollow fibers exclusive of the fin portions and wherein the shell has a cylindrical shape and said occupancy ratio y is expressed by the following formula (II):

$$y = (Nd^2/D^2) \times 100(\%) \qquad (II)$$

wherein D stands for the inner diameter ($\mu$) of the shell in which the hollow fiber bundle is filled, d stands for the average outer diameter ($\mu$) of the hollow fibers exclusive of the fin portions in the hollow fiber bundle, and N stands for the hollow fibers contained in the shell.

2. A fluid separator as set forth in claim 1, which comprises a selective-permeable hollow fiber bundle, a shell, partition wall portion for securing both the ends of the hollow fiber bundle into the shell, at the outer ends of which partition wall portion the hollow fiber bundle is opened, blood inlet and outlet portions connected to the inner sides of the hollow fibers, and dialyzing solution inlet and outlet portions connected to the outer sides of hte hollow fibers and the transport coefficient Kd of urea on the side of the dialyzing solution is at least 1/12 at 37° C. when the hemodialysis is carried out in the state where the average flow rate of the dialyzing solution in the hollow fiber-filled portion is 1.8 cm/sec.

3. A fluid separator as set forth in claim 1, which comprises a partition wall for securing both the ends of the hollow fiber bundle into the shell by a resin, wherein the distribution of the hollow fibers in at least one of the sections vertical to the axial direction of the hollow fiber bundle in the partition wall of the shell satisfies the requirement represented by the following formula (III):

$$\sigma/\bar{x} \leq 0.1 \qquad (III)$$

wherein $\bar{x}$ stands for the average value of the number of hollow fibers present in an area of 4 mm² where hollow fibers are present in said at least one section, and $\sigma$ indicates the standard deviation of said number of the hollow fibers.

4. A fluid separator as set forth in claim 3, which has fluid inlet and outlet portions connected to the inner sides of the hollow fibers, wherein said at least one section is on the partition wall of the fluid inlet portion.

5. A fluid separator as set forth in claim 3, which comprises fluid inlet and outlet portions connected to the inner sides of the hollow fibers, wherein said at least one section is on the surface of the partition wall of the fluid inlet portion side to which the hollow fiber bundle is opened.

6. A fluid separator for the hemodialysis, which comprises a bundle of selective-permeable hollow fiber membranes contained in a shell as set forth in claim 1, wherein most of the hollow fiber membranes have at least two fins extending in the longitudinal direction on the periphery thereof, and the total effective membrane area S (m²), the ultrafiltration coefficient UFR (ml/m²·hr·mmHg) and the urea clearance (ml/min) of the fluid separator satisfy any of the following requirements (IV) through (VI):

(IV) UFR/S $\leq$ 6 and CLU/UFR $\geq$ 30 in case of 0.5 $\leq$ S $\leq$ 1.0, (V) UFR/S $\leq$ 5 and CLU/UFR $\geq$ 30 in case of 1.0 < S $\leq$ 1.6, and (VI) UFR/S $\leq$ 4 and CLU/UFR $\geq$ 25 in case of 1.6 < S $\leq$ 2.5.

7. A fluid separator as set forth in claim 6, wherein the hollow fiber membranes are at least 50% cellulose and the membrane thickness of the fin-free portions is less than 30$\mu$ in the wet state.

8. A fluid separator as set forth in claim 6, wherein the hollow fiber membranes are composed of at least 50% of at least one member selected from cellulose, cellulose esters, polymethyl methacrylate, ethylene/vinyl alcohol copolymers, polyacrylonitrile, polycarbonates, polysulfones and polyethersulfones, and the membrane thickness of the fin-free portions is less than 50$\mu$.

9. A fluid separator as set forth in claim 1, wherein the selective-permeable hollow fibers have a plurality of crimps.

10. A fluid separator as set forth in claim 1, wherein the selective-permeable hollow fibers have a plurality of fins, which are substantially different in the average fin height and/or the distance between two adjacent fins.

11. A fluid separator as set forth in claim 10, wherein the average fin height of the highest fin is 1.5 to 10 times the average fin height of the lowest fin.

12. A fluid separator as set forth in claim 10, wherein the maximum distance between two adjacent fins is 1.5 to 10 times the minimum distance between two adjacent fins.

13. A fluid separator as set forth in claim 1, wherein the selective-permeable hollow fiber bundle comprises a plurality of selective-permeable hollow fibers having at least 3 fins, which are attached to one another through said fins, and the fins other than the fins attaching the hollow fibers to one another are substantially different in the average fin height and the distance between two adjacent fins.

14. A fluid separator as set forth in claim 1, wherein the selective-permeable hollow fibers are at least 50% cellulose type polymer having an average degree of polymerization of at least 150, and the ratio H/W of the fin height H to the fin width W is at least 0.5.

* * * * *

UNITED STATES PATENT AND TRADEMARK OFFICE
CERTIFICATE OF CORRECTION

PATENT NO. : 4,781,833

DATED : November 1, 1988

INVENTOR(S) : Shoji Mizutani and Nobuo Taneda

It is certified that error appears in the above-identified patent and that said Letters Patent is hereby corrected as shown below:

Column 4, line 58, change "fibers one" to --fibers to one--;

Column 6, line 56, delete "1.021" and insert --1.0<--;

Column 9, line 27, delete "manifested" and insert --imparted--;

Column 12, line 40, delete "less than 10 seconds, less than 5 seconds, and insert --less than 10 seconds, more than 5 seconds--;

Column 14, line 7, delete "a" and insert --an--; (first occurrence)

Column 14, line 16, delete "were" and insert --are--;

Column 18, Table 4, change "West" to --Wet--;

Column 19, Table 7, after "Example 14" insert --$*^3$--;

Column 23, line 30, change "hte" to --the--;

Signed and Sealed this

Thirty-first Day of July, 1990

*Attest:*

HARRY F. MANBECK, JR.

*Attesting Officer*     *Commissioner of Patents and Trademarks*